ent Office 3,417,680
Patented Dec. 24, 1968

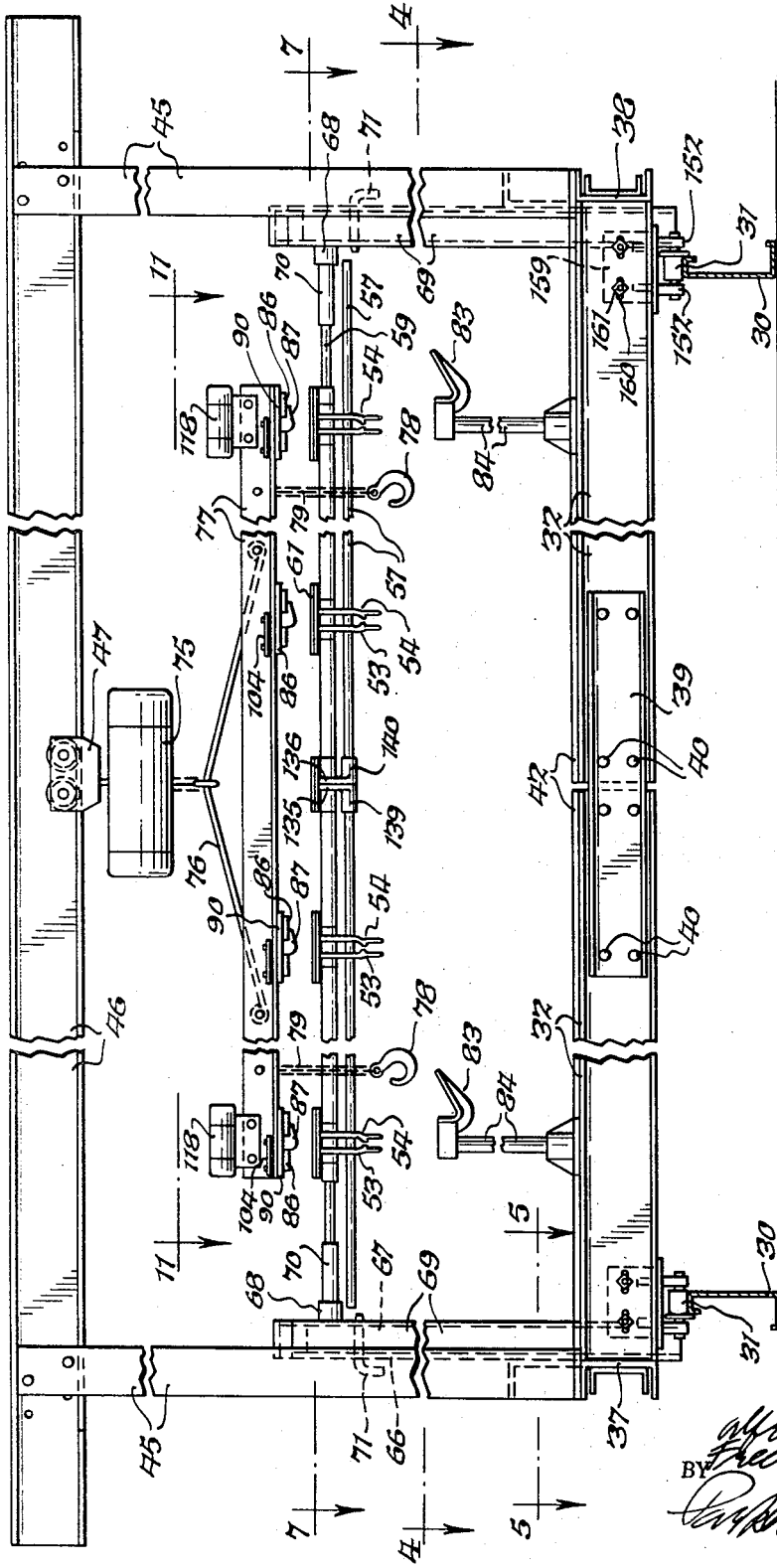

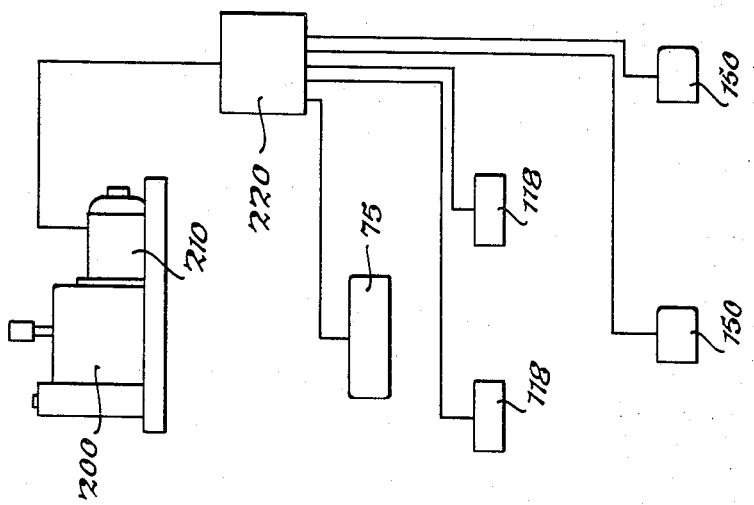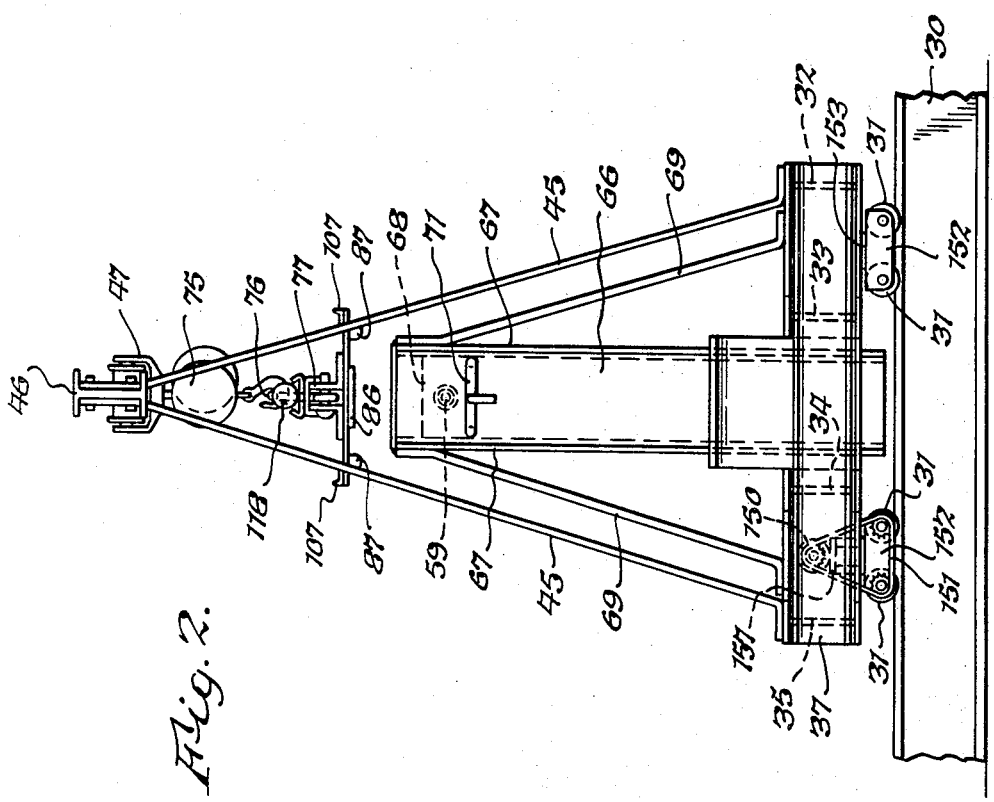

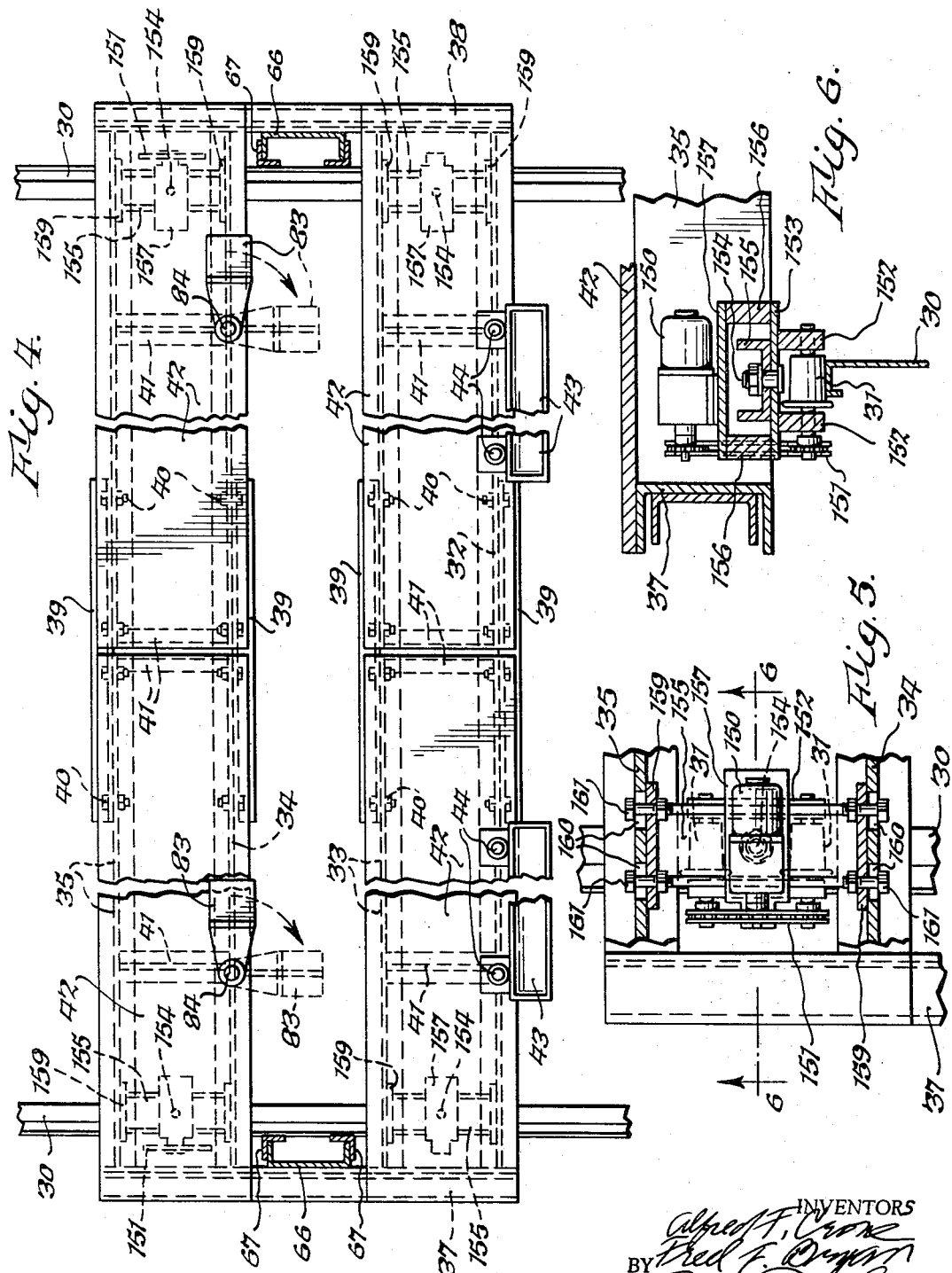

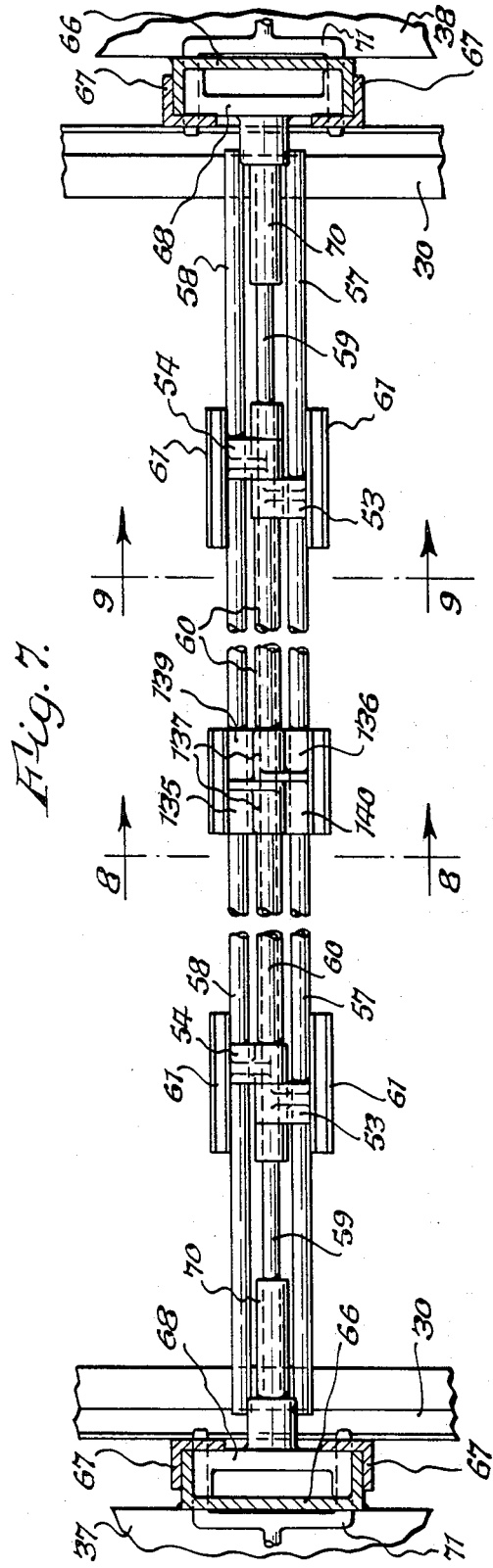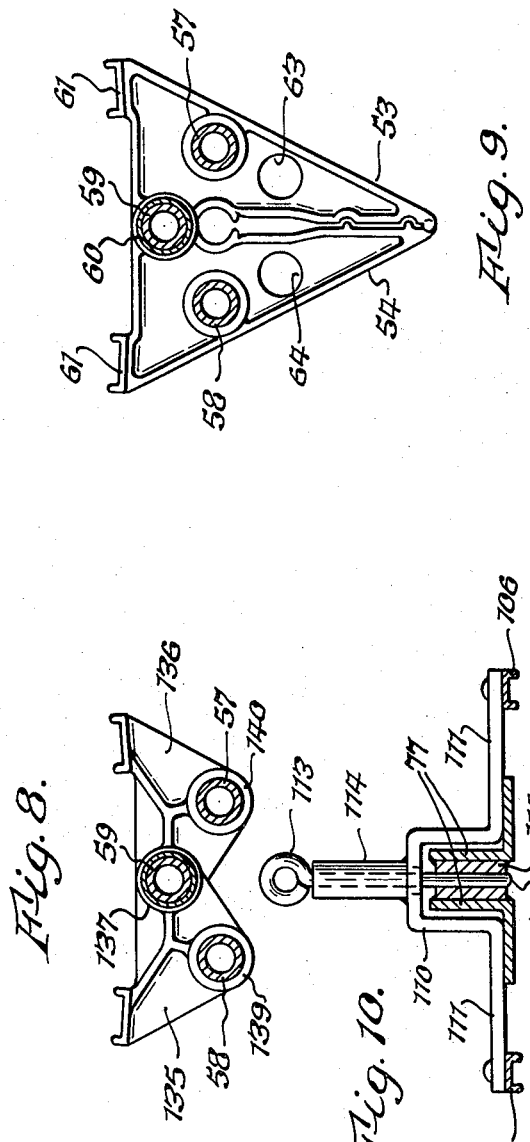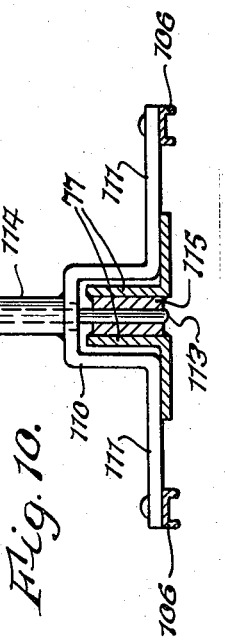

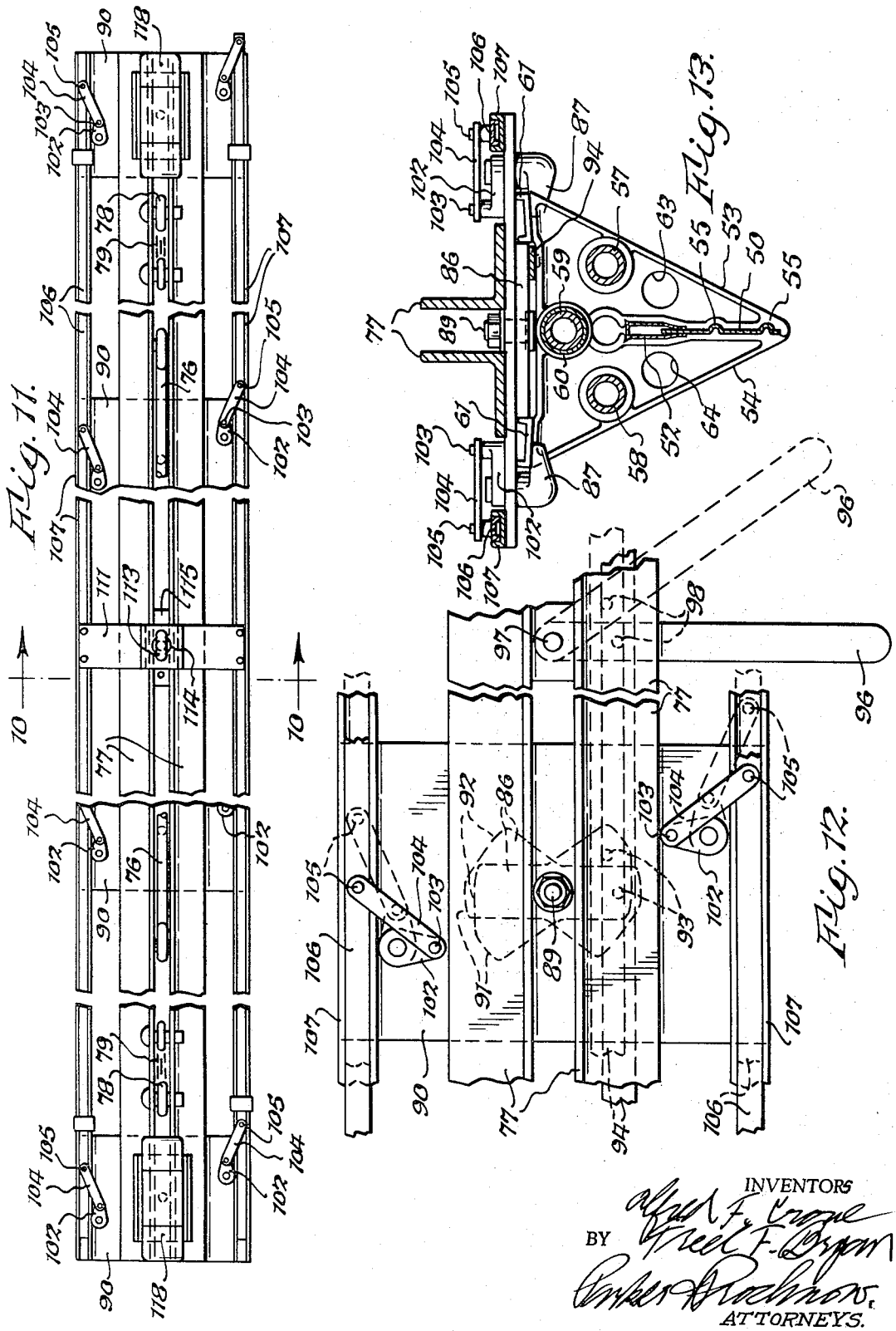

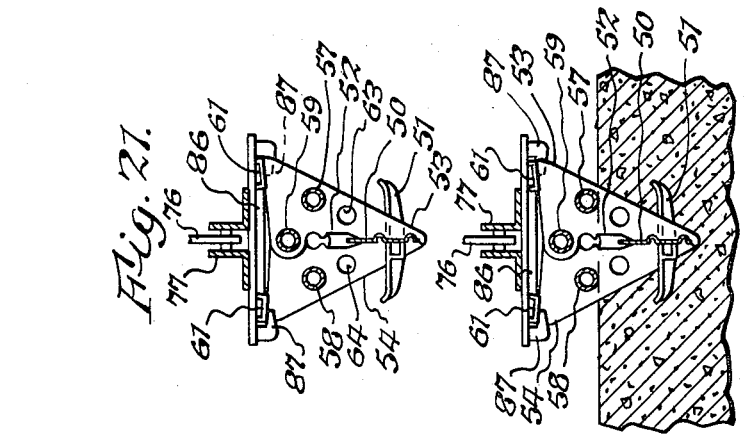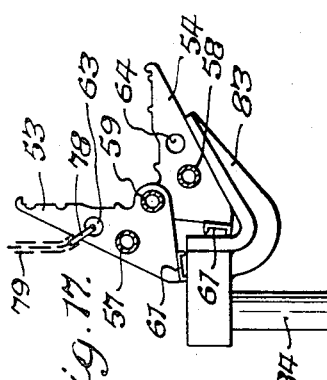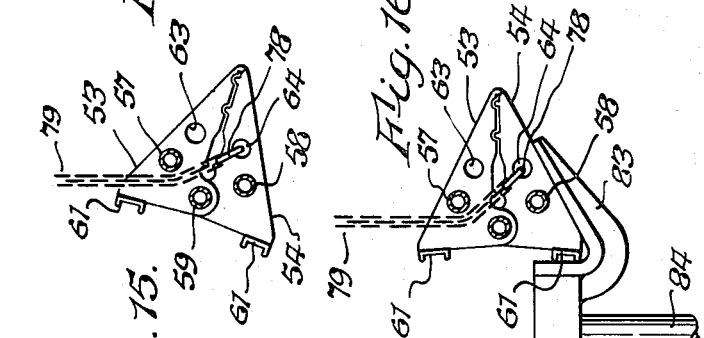

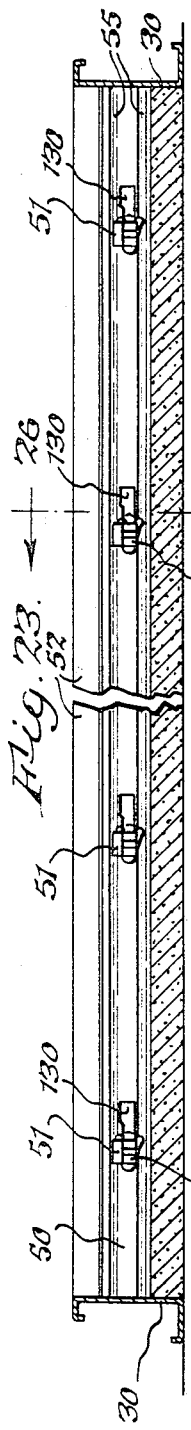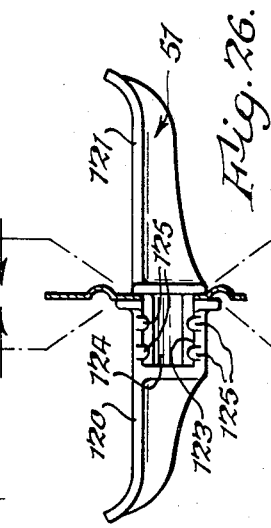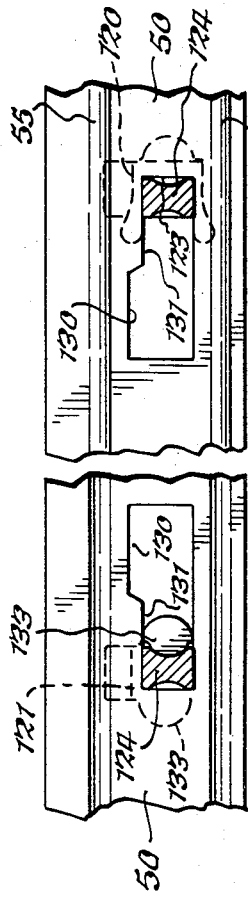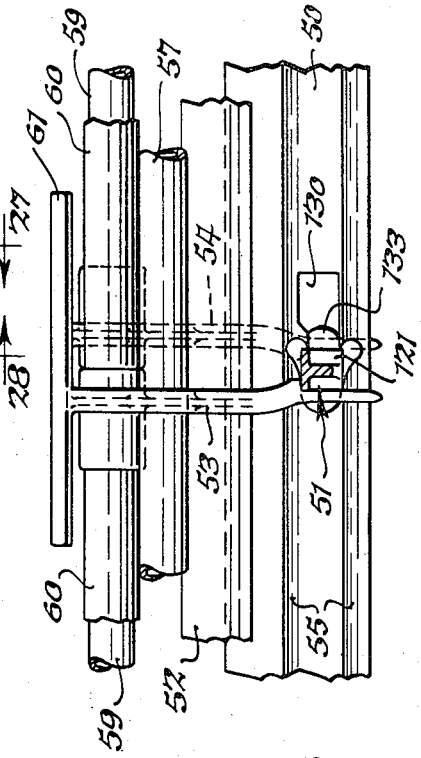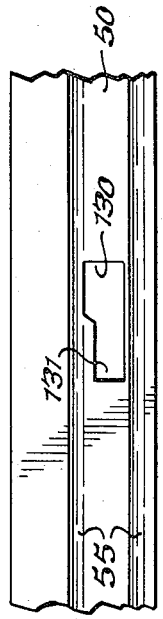

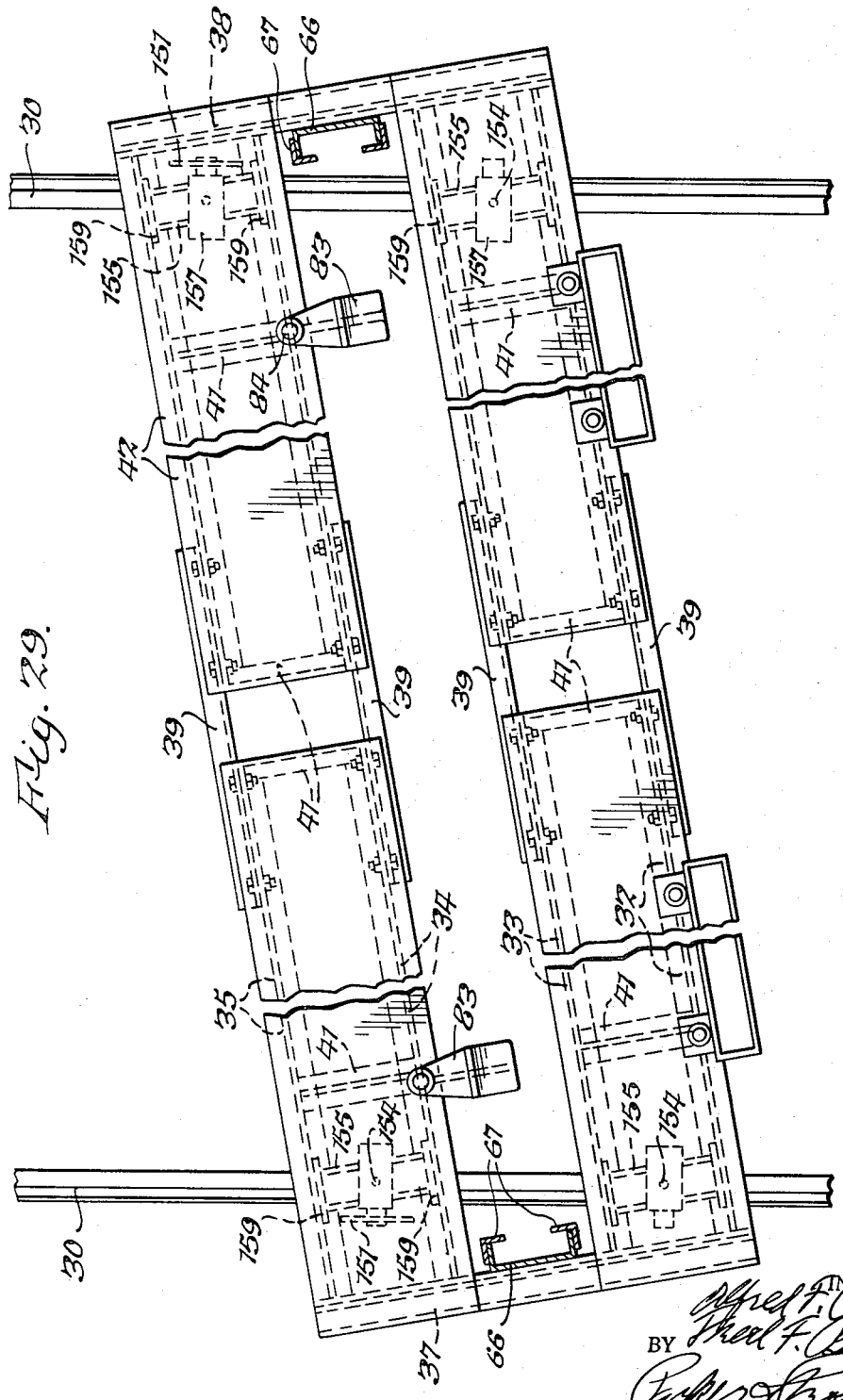

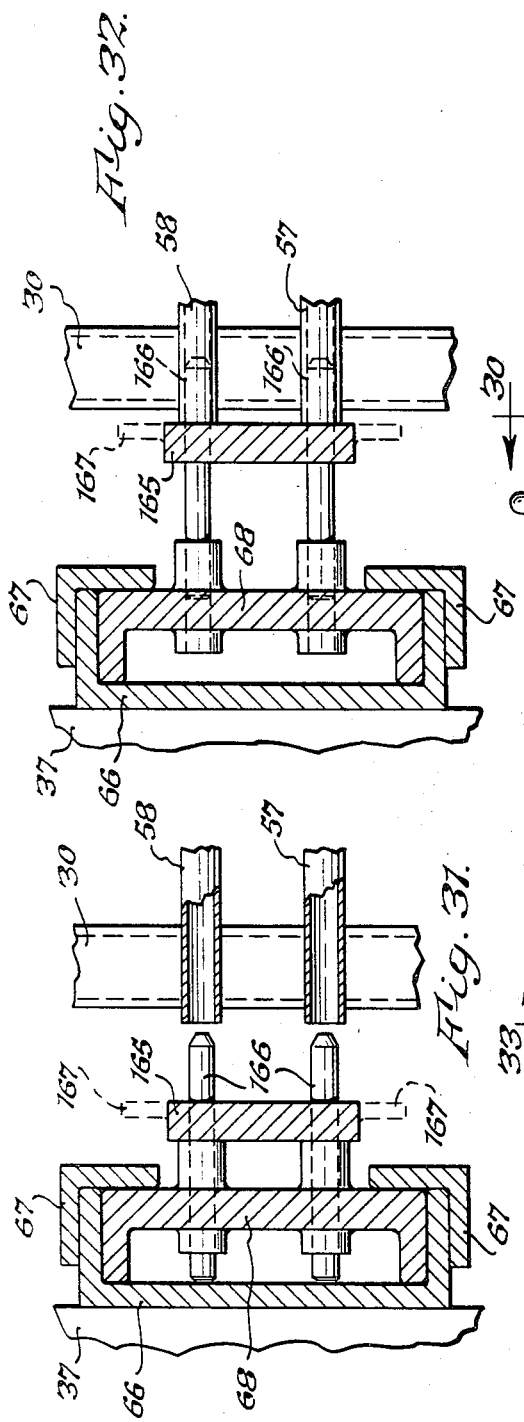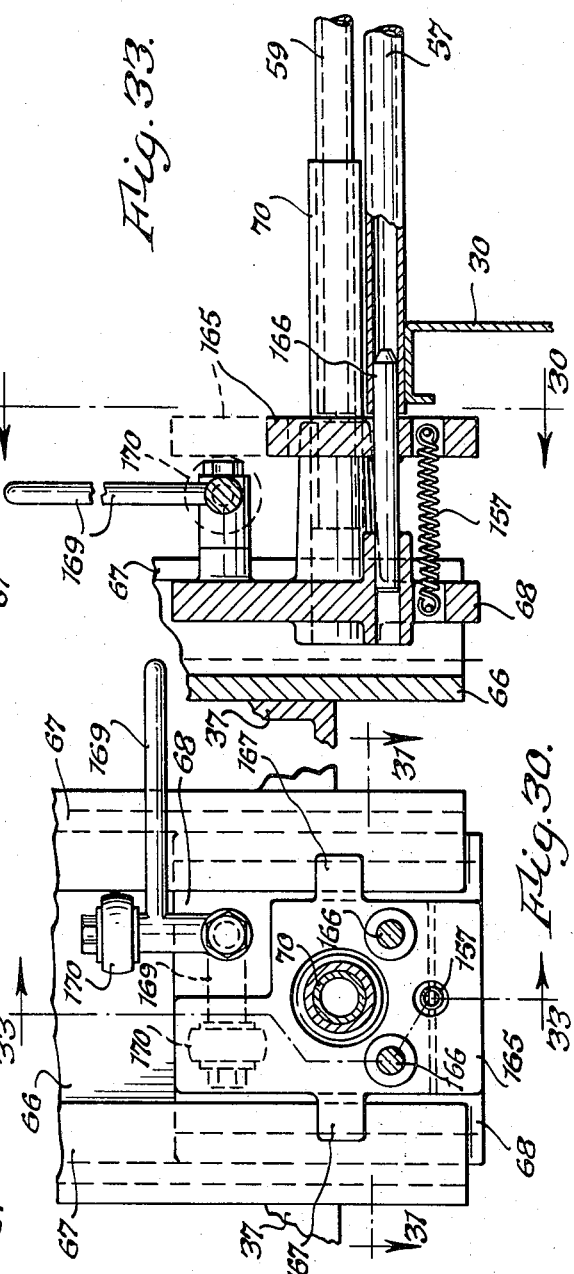

3,417,680
POSITIONING HIGHWAY JOINT SUPPORTS AND SHEAR PLATES IN PAVING MATERIAL
Alfred F. Crone and Freel F. Bryan, Williamsville, N.Y., assignors to Acme Highway Products Corporation, Buffalo, N.Y.
Filed July 10, 1967, Ser. No. 652,198
27 Claims. (Cl. 94—51)

ABSTRACT OF THE DISCLOSURE

This invention relates to the positioning of joint support assemblies, which include joint supports and center or shear plates, in paving material while the same is in plastic or semi-liquid condition, and the apparatus shown for this purpose includes means for positioning the joint support assemblies in correct relation to the pavement. The apparatus also includes supporting brackets on which the center plate and joint supports may be assembled in correct relation to each other and to the machine for sinking into the pavement. The invention also includes cooperating parts on the center plate and the joint supports for facilitating assembly of these units on the apparatus.

In the accompanying drawings:

FIG. 1 is a side elevation of an apparatus embodying this invention.

FIG. 2 is an end view thereof.

FIG. 3 is a diagrammatic view showing electrical connections between various parts of the apparatus.

FIG. 4 is a sectional plan view thereof on line 4—4, FIG. 1.

FIG. 5 is a fragmentary sectional plan view thereof on line 5—5, FIG. 1.

FIG. 6 is a sectional view on line 6—6, FIG. 5.

FIG. 7 is a sectional elevation thereof on line 7—7, FIG. 1.

FIG. 8 is a fragmentary sectional elevation on line 8—8, FIG. 7.

FIG. 9 is a sectional elevation on line 9—9, FIG. 7.

FIG. 10 is a sectional view taken on line 10—10, FIG. 11.

FIG. 11 is a fragmentary plan view on line 11, FIG. 1.

FIG. 12 is a top plan view showing the mechanism for shifting the locking devices for the gripping members which hold the joint support assemblies.

FIG. 13 is a sectional view showing a side elevation of one of the gripping members for the joint support assemblies.

FIGS. 14–22 show side elevations of gripping devices in various positions.

FIG. 14 shows the gripping device after it has positioned a joint supporting assembly in the concrete and after it has been withdrawn from a paving material and showing a chain connected therewith for positioning the gripping device on its side.

FIG. 15 is a similar view showing the gripping devices after they have been pulled up by the chain.

FIG. 16 shows the gripping device supported on the apparatus above the paving material.

FIG. 17 shows the gripping device opened to recieve a center plate and joint supports.

FIG. 18 shows the gripping device with a center plate and other parts of the joint supporting assembly positioned thereon.

FIG. 19 is a view similar to FIG. 18 but showing the jaws of the gripping device in closed position and showing the joint supports in place on the center plate.

FIG. 20 is a view showing the gripping device with the joint units assembled thereon and held supported above the paving material.

FIG. 21 is a view similar to FIG. 20 but showing the gripping device supported under parts of the apparatus ready to be lowered into the pavement.

FIG. 22 shows the gripping device with parts mounted thereon lowered into the pavement.

FIG. 23 is a vertical sectional elevation of the pavement with the gripping devices and the joint units positioned therein.

FIG. 24 is a fragmentary view of a center plate provided with a slot for receiving a joint support.

FIG. 25 is a sectional elevation of the paving material with the gripping devices and joint units embedded therein.

FIG. 26 is a vertical sectional view of one of the joint members mounted in the center plate and is taken on line 26—26, FIG. 23.

FIGS. 27 and 28 are vertical sections taken along the correspondingly numbered lines 27—27, 28—28 in FIG. 23.

FIG. 29 is a top plan view of the apparatus similar to FIG. 4 and showing the apparatus positioned for supporting the joint units at an angle to the width of the pavement.

FIG. 30 is a vertical section taken on line 30—30 of FIG. 33 showing a modified construction of gripping device stabilizing means.

FIG. 31 is a horizontal section along line 31—31, FIG. 30 showing the stabilizer disengaged while FIG. 32 is a similar section shown engaged.

FIG. 33 is a vertical section along line 33—33 of FIG. 30.

The apparatus serves to place the joint support assembly into the concrete of a road or highway while in plastic condition and between two forms 30, and these forms also serve as tracks by means of which our improved apparatus may be moved lengthwise of the road bed. For this purpose the apparatus is provided with wheels or roller 31 having flanges on their outer ends which engage the outer edges of the upper flanges of the forms 30. The apparatus includes a frame or base having transverse frame members 32, 33, 34, and 35 which extend crosswise of the apparatus and the road bed and the ends of which are connected by longitudinal frame members 37 and 38. These frame members may be made of any suitable structural shapes. For example, the frame members may be made of channel beams suitably secured together in any suitable or desired manner. Because of the fact that the highways are frequently made of considerable widths, it is desirable to construct each of the transverse frame members 32, 33, 34, and 35 in two parts which may be connected by means of other channel members 39, those shown being of somewhat smaller size than the transverse frame members so as to fit between the upper and lower flanges of the transverse frame members, and may be suitably secured thereto in any manner, for example, by means of bolts 40.

In order to preserve proper spacing of the two sets of transverse frame members, cross bars 41 may be provided adjacent to the inner ends of the two halves of the transverse frame members and at other intermediate locations. Suitable flooring, 42 may be laid on the frame members 32 and 33 and also on the frame members 34 and 35, on which the operators of the apparatus may walk and the middle portion between the frame members 33 and 34 is left open. A base frame of any other suitable construction may be provided, and boxes 43 for parts of the joint assemblies to be positioned between the gripping members, may be mounted on the base frame. The supply boxes 43 are actuated to working level by swivel supports 44.

The frame of the apparatus also includes upwardly extending inclined members 45 which are suitably secured at the lower ends to the frame members of the base and which are connected at their upper ends to a beam 46 of any suitable construction and which may, for example, be an I-beam which cooperates with a trolley 47 which supports certain parts of the apparatus and which is movable crosswise of the apparatus.

The joint support assemblies include a center plate or shear plate 50 and joint supports 51, see particularly FIGS. 9, 13, 23, 25, 26, 27 and 28 and also a groove forming member 52. These joint support assemblies are held by means of gripping members 53 and 54, the lower portions of which are formed to engage the opposite sides of the center plate to hold the same and the joint supports mounted thereon in fixed relation to each other while these joint support assemblies are moved downwardly into the plastic concrete. For example, the center plate may have longitudinally extended grooves or beads 55, and the lower parts of the gripping members are provided on their inner faces with correspondingly shaped recesses into which these beads extend when the gripping members are in closed positions, as shown in FIG. 13. The inner faces of the gripping members may also be formed to hold deflated seals, as shown in Crone Patent No. 3,324,775. A number of these gripping members is provided on the apparatus to position the joint supports in the pavement at specified distances from each other.

The correct depths of the joint support assemblies in the concrete can readily be effected by stop members 57 and 58 which are in the form of tubes or rods extending through these gripping members and to rest into positions upon the forms 30.

The upper portions of the two parts of the gripping members are pivotally mounted on a pivot member 59 which may also be in the form of a tube extending across the apparatus and having a sleeve 60 on which all of the gripping members are suspended. The gripping members also have supports or rails 61, those shown being of channel shape. With this construction it will be obvious that when the rails 61 are raised in any suitable manner, they will move toward each other about the pivot member, and the lower parts of the gripping members will be swung outwardly about the pivot member 59, thus causing the lower ends to be moved out of engagement with the center plate and joint supports, whereupon the gripping members may be moved upwardly clear of the center plate and joint supports, thus leaving them in the paving material in the desired positions into which they have been placed. The two gripping members are also provided with holes 63 and 64 extending through the same. The halves or parts of the gripping members are provided at their upper ends with tubular bearings through which the pivot member 59 extends and which space the two parts of the gripping members in correct relation to each other.

There is also provided at each side of the frame of the apparatus a vertical bearing member or guide including a stationary channel 66 having secured thereto the legs of the channel angle bars 67 extending over and partly enclosing the channel. Confined with this channel by the angle bars 67 is a smaller channel 68 movable vertically. Each of these channels 68 has a sleeve 70 extending toward the middle of the apparatus and these sleeves receive the ends of the pivot member 59. The movable member 68 may be held in fixed position by means of a locking device 71 consisting of a pair of arms guided for movement in holes in the channel 66 and the angle bar 67. Braces 69 are fastened to the frame members 37, 38 and are fastened to the uppermost portion of the guide channels 66 and 67 to rigidize this guide.

Hoisting means are provided which include a suitable motor-operated hoist or drum 75 connected with a sling 76, the ends of which are connected to a hoisting beam 77. Suitable hooks 78 are secured to chains 79 which depend from the hoisting beam 77, and the hooks when not in use may be temporarily attached directly to the hoisting beam, particularly during vibration. This beam is preferably formed of two angle bars spaced apart, as shown in FIGS. 11 and 13.

We also provide on our apparatus means whereby the various parts of the joint support assembly may be positioned in the gripping devices and for this purpose the gripping members may be raised and supported on suitable rests 83 which are mounted on standards 84 supported on one of the transverse beams, for example, the beam 34. The rests or supports 83 may be turned from the position shown in FIG. 1 into a position shown in FIG. 4, in which they extend over the open space between the two platforms of the apparatus.

After the gripping devices have been disengaged from one set of joint support assemblies after depositing them in the concrete, they are raised clear of the paving material in which position they are held by the engagement of the locking device 71 with the movable members 68 which support the pivot member and the parts dependent therefrom in raised position. The hooks 78 are inserted into the holes 64 of two of the gripping members as shown in FIG. 14. When the lifting device raises the hooks 78, all of the gripping devices will be swung about the pivot member or shaft 59 into a position approximately as shown in FIG. 15. The supports 83 are then turned to position under the gripping members which can then be lowered to rest on the supports 83 as shown in FIG. 16. The hooks 78 are then disengaged from the holes 64 and passed through the openings 63 on the other halves of the gripping members. Since all of the parts of the gripping members are connected by means of the shafts or rods 57, 58, and 59, the movement of the parts of two of the gripping members by the chains 79 will cause the similar parts of the gripping members to be moved through the same angular relations. When the hooks are connected with the holes 63 and the chains are raised, the upper parts 53 of the gripping members will be swung into positions spaced from the other parts of the gripping members as clearly shown in FIG. 17. The various parts of the joint support assembly can then be positioned on the lower half 54 of each gripping member, including, for example, the groove former 52 and the center plate 50. While the parts are in the position shown in FIG. 18, the joint supports 51 may be positioned on the center plates as hereinafter described. The upper part of the gripping members is then swung back about the pivot shaft 59 as shown in FIG. 19.

When the parts are thus assembled, the hooks are then engaged with the pivot member 59 whereupon the two halves of the gripping members will hold the joint support assemblies in operative relation to each other and to the gripping members as shown in FIG. 20. By means of the construction described it will be obvious that if any joint support is incorrectly mounted on the center plate, the two parts of the gripping members will not move into the closed position as shown in FIG. 19. The two parts of a gripping member are positioned to engage opposite sides of the joint supports and hold them securely in these positions. Any incorrect positioning of one or more joint supports can be readily seen if the two parts of the gripping members do not move into their correct positions, and the joint supports can be readily moved manually into their correct positions.

In order to hold the two parts of the gripping members correctly positioned in engagement with the joint support assembly during lowering of the same into the concrete, a lock member 86 is inserted between the two channel beams or rails 61 which prevents the two parts of the gripping members from swinging outwardly to release the joint support assembly. At the same time hooks 87 are moved into engagement with the under faces of the rails 61. These hooks and the lock members 86 are mounted on the hoisting beam which is lowered to position the lock member 86 and the hooks 87 into locking engagement with the gripping members as shown in FIG. 21. The hooks are for lifting the gripping members out of the concrete after the two halves of the gripping members have been separated to disengage the joint support assembly.

While the pivot shaft 59 is held in a raised position as shown in FIG. 21, by the vertically movable members 68, the hoisting beam 77 is lowered to position the locking member 86 between the rails 61 of some of the gripping members. These locking members may be of any suitable construction, those shown each being in the form of a disk pivoted at 89 on a cross member or plate 90 extending across the space between the two angle bars constituting the hoisting beam 77, and secured to these angle bars. This disk has portions 91 of larger diameter and portions 92 of less diameter. Consequently when this locking disk is turned so that the parts of larger diameter engage the rails 61 of a gripping member, these rails will be held spaced from each other, thus holding the two parts 53 and 54 of the gripping members in tight engagement with the joint support assembly. Consequently when the locking disks are turned so that their peripheral parts of smaller diameters are turned to face the rails 61, the two parts of each gripping member will be free to turn about the pivot member 59 sufficiently to disengage the joint support assemblies.

The various locking disks for the several gripping members may be turned on their pivots in any suitable manner. In the construction shown for this purpose a pivot pin 93, FIG. 12, connects each locking disk with a rod or bar 94 positioned below one of the hoisting beam angles 77. This bar 94 may be shifted in a direction of its length by means of a disk shifting lever 96 pivoted at 97 on a fixed part of the hoisting beam and having another pivot 98 connected to the bar 94. Consequently by swinging the lever 96 from one position to another, all of the disks 86 are swung into similar positions on the several gripping members.

For lifting the gripping members out of the concrete after the joint support assemblies have been positioned therein, we have provided on the cross plates 90, hooks 87 arranged so that these hooks can be swung into lifting positions underneath the rails 61 as shown in FIG. 13. These hooks have pivots extending upwardly through the cross plate 90 and have laterally extending arms 102 rigidly secured thereto above the cross plate. In order to move the several gripping members simultaneously, the arms 102 have upwardly extending pivots 103 which are connected to links 104, the other ends of the links being provided with pivots 105 connected to longitudinally movable members 106, suitably guided in trough-shaped guide members extending throughout the width of the apparatus. The constructions for shifting the hooks 87 are identical at opposite sides of the cross plate 90.

The means for shifting the hooks 87 simultaneously on both sides of the gripping members and locking them in either of their two positions may comprise a bridge member 110, FIGS. 10 or 11, of approximately U-shape which straddles the two angle bars that constitute the hoist member or beam 77, and have outwardly extending arms 111 the ends of which are connected to the longitudinally movable members 106. Consequently by moving the bridge mmeber along the angle bars the hooks 87 may be moved into either of their two positions. I have also provided on the angle bars 77 a vertically movable lock pin 113 which fits into a hollow tube extension 114 and which may serve as a handle to move the bridge member 110. The lock pin 113 can be made to engage in one or the other of a pair of holes provided in a cross piece 115 connecting the angle bars of the hoist beam 77. The holes may be spaced so when the pin 113 moves downwardly into position in one of the holes, the hooks 87 will be in engaging position as shown in FIGS. 12 and 13 and when the locking pin engages the other hole, the hooks 87 will be turned into a position out of engagement with the gripping members. These hooks 87 serve not only to hoist the gripping members out of the concrete, but also, after the locking member 86 have been moved out of locking positions, the upward force applied to the gripping members causes the two parts 53 and 54 to swing outwardly away from each other about the pivot member 59, and away from the joint support assembly, so that this assembly remains in correct position in the concrete.

The joint support assembly is lowered into the plastic concrete not only by the weight of gripping members and the parts of the apparatus connected therewith, but by vibration. For this purpose we mount on the hoisting beam 77 a pair of motor driven vibrators 118 of any suitable construction. When the hoisting beam is lowered to rest on the gripping members as shown in FIG. 13, the vibrations will be transmitted directly to the gripping members so that any stones encountered in the concrete by the center plate or joint supports will be shifted out of the way of the downward movement of these parts, so that the center plate will occupy a vertical position throughout its length and will not be bent by any obstructions encountered in its downward movement in the concrete.

Center plate 50, FIG. 23, is provided with a plurality of joint supports arranged at intervals lengthwise thereof and each is preferably made of two halves 120 and 121 which are mounted at opposite sides of the center plate. The two halves of the joint support are slidably and frictionally held relatively to each other during expansion and contraction of the two slabs of the pavement. This frictional connection between the two halves of each joint support may be of any suitable or desired type and in the construction herein shown, FIG. 26, to illustrate one embodiment of this invention, the half 120 of the joint support is provided with a recess or socket 123 of U-shaped cross section, and the other half 121 is provided with a projection or dowel 124 which fits into this socket 123 and is held in place therein by suitable lugs or clamping members 125 which extend over the open side of the socket 123 and are bent over into engagement with the dowel 124 so that the two parts of the joint support are frictionally held together for positioning into the paving material, the friction insufficient however to hold the two parts of the joint support in fixed relation to each other, as shown in FIGS. 23 and 26 during expansion and contraction of the two adjacent slabs of the paving material, according to Patent No. 3,288,039 of Nov. 29, 1966.

Heretofore it has been necessary to supply the two separate halves of the joint supports to a joint assembly department for insertion through holes in the center plates and then to bend over the lugs 125 to form a frictional connection between the two halves of the joint supports. However, we have found that a more efficient assembly of the joint supports on the center plate is possible by assembling the two halves of the joint supports in a shop or factory by forcing the lugs 125 securely into engagement with the dowel 24 of the other half of the joint support.

In order to enable the two frictionally assembled halves of the joint support to be positioned on a center plate, we have provided the center plate with holes or apertures in the same as shown in FIGS. 24, 25, 26, 27, and 28 each hole or aperture comprising a larger part 130 and a smaller part 131, these two parts being joined. The part 130 of the hole is of such size that one-half of the joint support, for example, the half 121, may readily pass through the same, but the other part 120 is provided with a flange or abutment or other enlargement which prevents passage of the half 120 of the joint support through the part 130 of the hole. For example the socket half 120 of the joint support may be provided with a lateral projection of any type, such for example as the flange which extends laterally beyond the limits of the part 131 of the hole or aperture. The half 120 may also be provided with a flange or extension 133 which however is of such size as to permit the part 121 to pass through the larger part of the hole in the center piece, and consequently, when the half 121 of the assembled joint support has been passed through the larger part of the hole in the center plate, the entire joint support may be slid lengthwise of the center plate into the smaller part 131, and when in this position the flange or projection 133 on the half 121 of the joint support will engage the part of the center plate above or below the smaller part 131 of the hole and the flange or enlargement of the half 121 of the joint support will engage the opposite face of the center plate.

The operation of installing the joint supports on the center plate is greatly simplified by the construction shown in that each complete joint support may be merely passed partly through the enlarged part 130 of the hole and further movement of the joint support relatively to the center plate is then prevented by the flange or enlargement of the joint support and when movement of the joint support relatively to the center plate is stopped by this enlargement, it can be readily moved into the smaller part of the hole 131 in the center plate.

Because of the width of the apparatus, it is desirable to divide it into two parts, so that the separated parts can be transported from one road building job to another by trucks of standard sizes. The base of the apparatus is for this purpose divided as shown in FIG. 1. The pivot member 59 and the stop members 57 and 58 also extend throughout the width of the apparatus and consequently they are also divided lengthwise into two halves. Those two halves are connected by means of connecting members as shown in FIG. 8 which consists of two parts 135 and 136. Each of these parts has a hub or sleeve 137 through which the adjacent ends of the two parts of the pivot member 59 extend. These two parts of the connecting member are also provided with sleeves or hubs 139 and 140 into which the adjacent ends of the two parts of the stop members 57 and 58 extend. By means of this arrangement the pivot member halves and the halves of the stop members may swing relatively to each other in the same manner as they are forced to swing by their connections with the gripping members.

The wheels or rollers on which the apparatus is moved on the forms 30 from place to place on the road bed are arranged in groups, two on each side of the apparatus. Each group includes a pair of wheels and the wheels of one group on each side of the apparatus are driven by a motor 150 connected by a sprocket chain 151 with the two wheels of a group. Each pair of wheels is journalled on bearing brackets 152 secured to a horizontal plate or member 153 which has a pivotal connection by means of a bolt 154 with a stationary cross member 155 secured to the base of the apparatus. In those groups in which a motor drive is provided, spacers 156 support a platform 157 on which the motor 150 and a speed reducer are mounted. Consequently when the plate 153 is turned on the pivot bolt 154, the motor is turned also, so that a correct drive from the motor to the wheels 31 is maintained. The extent to which the wheel supporting plate 153 may be turned is determined by the upwardly extending spacers 156 of the plate 153. The cross member 155 has end plates 159 engaging the frame members 32, 33, 34 and 35. These frame members are provided with slots 160 through which bolts 161 extend. These bolts extend through holes in the ends 159 of the wheel supporting plate and serve to lock these plates 153 in the frame of the apparatus. This construction enables the wheels to be secured at different distances apart in case variations in spacing the forms 30 from each other occur. At times it is desired to arrange the apparatus in angular relation to the road bed, as shown in FIG. 29.

When it is desired to position the joint support assemblies in angular relation to the length of the pavement, the frame of the apparatus will be somewhat longer than when the apparatus is used as shown in FIG. 1. In that case the diagonal frame members 32, 33, 34 and 35 are lengthened so that the spacing members 39 are secured to the transverse members by means of bolts extending through a different set of holes to produce the spacing shown in FIG. 29. Similarly the pivot members 59 and the stop members 57 and 58 may be elongated by providing the connecting members with longer sleeves or hubs to which the adjacent ends of the two parts of the pivot and stop members may fit.

We also provide means which may be used if desired for assuring that the pivot member and the two stop members 57 and 58 remain in constant angular relation to the frame of the apparatus. For this purpose we provide a removable connection between the vertical movable member 68 on which the pivot member 59 is mounted with means for connecting the stop members 57 and 58 in fixed relation to the vertical movable member 68. This can be affected in any desired manner, for example, by providing a plate 165 which has pins 166, FIGS. 31 and 32 secured thereto and positioned to be movable into engagement with the hollow tubular stop members 57 and 58. This plate is urged by means of spring 157 into a position in which the pins 166 extend out of the stop members 57 and 58. The plate 165 may be held in a position in which the pins 166 extend into the stop members 57 and 58 in any suitable means, for example, a lever 169 having a roller 170 which cooperates with the plate 165 to hold the same in its locking position, FIGS. 30 and 33.

Arms 167 aid in engaging the pins 166 in locking position against spring tension by permitting the operator to grasp the arms 167, move the pins into position and then throw the lever 169 and its roller 170 into holding arrangement. The roller provides for quick friction-free release when opening of the stop members 57 and 58 upon positioning of the joint assemblies.

In any convenient locations on the flooring 42 of the front bridge supported by the frame members 34 and 35 may be placed a power generator set 210 having a gasoline engine 200 to drive it. Also a control panel 220 may be provided to switch power to the various motor driven units, such as the hoist 75, the transport motors 150 and the vibrators 118. The transfer motors on opposite sides of the apparatus are generated independently so that in going around a curve, the motor on the outer part of the curve might be operated at a higher speed.

The operation of the apparatus after the same has been positioned upon the two forms 30, may be effected by two men, and for this purpose the various controls are all positioned to be readily accessible from the rear bridge formed, for example, by two of the transverse beams 32 and 33. The first step in the operation is to place the gripping members as shown in FIG. 9 into position to have the joint support assemblies positioned thereon. For this purpose the handle 114, as shown in FIG. 10, is pulled forwardly into a stop position and locks the parts by means of pins 113, shown in FIG. 11. This removes the connecting hooks 87 from engagement with the channels 61 of the grippers. The lifting hooks 78 may now be detached from the hoisting frame to which they are temporarily secured while not in use.

The hoisting frame is then lowered sufficiently to lower the lifting hooks 78 so that they may extend between the tubes 59 and 57 and hook into a hole 64, as shown in FIG. 14. The hoist is then actuated to lift the gripping assembly into a position to rest on the bracket 83 to support the gripping assembly. The hooks 78 are then removed from the holes 64 and hooked in the holes 63, thus gripping the upper halves of the gripping members and the hoist is then actuated to move the part 53 of each gripping member to a vertical position, as shown in FIG. 17. The gripping half 53 is held in this position until a center plate 50, a plastic groove-forming member 52 and joint supports are assembled on the parts 54 of the gripping member. If desired, a deflated seal as shown in Crone Patent No. 3,324,775 may be positioned on the lower parts 54 of the gripping members. The half 53 of each gripping member is then lowered to rest on the half 54, as shown in FIG. 19.

The lifting hooks 78 are then removed from the holes 63 and attached to the pivot tube 59, whereupon the gripping frame with the various joint assembly parts assembled thereon is raised until it hangs in a vertical position, as shown in FIG. 20. The vertically movable guide members 68 at the opposite sides of the apparatus are then locked to the gripping assembly, by means of pins 71. The lifting hooks 78 are then removed from the pivot tube 59 and these hooks are attached temporarily to the hoisting frame 77. The hoisting frame is then lowered to rest lightly on the gripping frame until both frames are properly positioned for pushing the handle 114 forwardly to lock with the pin 113. When the hoisting frame is thus positioned in operative position to the gripping frame, the locking plate handle 96 is moved in a counterclockwise direction to turn the locking plate 86 into a position in which its parts of largest diameter engage the bars 61. The connecting hooks 87 must also be in engagement with the channel bars 61 so that the parts are in the position shown in FIG. 13.

The sliding plates 165 at opposite sides of the apparatus are moved into positions shown in FIGS. 32 and 33 to lock the gripping mechanism to the vertically slidable members 68 and are locked by moving the roller lock handle 169 to a vertical position as shown in FIG. 33. The locking pins 71 which lock the gripping frame member to the vertically moving members 68 are removed and the assembly, including the gripping frame, is then lowered until just above the concrete, as shown in FIG. 21. The vibrators 118 are then started and continue to operate while the assembled gripping members and parts held thereby are lowered into the concrete, as shown in FIG. 22.

When the depth gage tubes 57 and 58 both rest on the paving form 30, the handles 96 which control the position of the locking plate 86, FIG. 12, are moved to turn the plate 86 into unlocking position, and the vertical stabilizer lock handle 169 is turned to a horizontal position to disengage the gripper assembly from the vertically movable member 68. The gripper assembly is then lifted from the concrete and the vibrators are turned off and the gripper frame is returned to a stop position and locked with pins 71. The apparatus is then moved forwardly to the next joint support position by means of the drive motors 150 and the operations as above described are repeated.

During this operation of the machine only one device, namely the connection with the vertically movable member 58, requires a man at each side of the machine. The other locks of the apparatus are each controlled by one handle which operates multiple locking attachments as shown in FIGS. 11–13 inclusive. Similarly a single operator operates all of the control switches and locking controls.

It will be understood that various changes in the details, materials and arrangements of parts which have been herein described and illustrated in order to explain the nature of the invention may be made by those skilled in the art within the principle and scope of the invention as expressed in the appended claims.

We claim:

1. Apparatus for installing joint support assemblies in a highway while the concrete of the same is in plastic condition, said apparatus including
a pivot member extending throughout the width of the apparatus and slidable vertically,
gripping members mounted at intervals on said pivot member and each including two parts swingable in opposite directions toward each other to support between them the assemblies to be positioned in the concrete,
hoisting means arranged above said pivot shaft and having parts to engage said gripping members,
lock members supported on said hoisting means and formed to be lowered by said hoisting means into engagement with the parts of said gripping members to hold the same in gripping relation to said assemblies when lowered into the concrete by said hoisting means.

2. Apparatus according to claim 1 and including hooks on said hoist means engageable with said gripping members for moving the parts of said gripping members outwardly from each other to release assemblies installed in the concrete when said hooks are raised by said hoist means.

3. Apparatus according to claim 1 in which said gripping members have portions extending below said pivot member for gripping the assemblies, and portions extending above said pivot member, said lock member when lowered into its operative position engaged said portions of said gripping members above said pivot member to hold said parts of gripping members in engagement with the assemblies.

4. Apparatus according to claim 3 in which said hooks engage said parts of said gripping members at opposite side of said pivot member to move said parts of said gripping members outwardly away from each other when said lock member is moved out of engagement with said gripping members.

5. Apparatus according to claim 1 in which said locking members are pivoted on said hoisting means to turn into and out of locking position when lowered into engagement with said gripping members.

6. Apparatus according to claim 5 and including mechanism mounted on said hoisting means for simultaneously turning all the locking members when the same are lowered into operative position to said gripping members.

7. Apparatus according to claim 2 and including mechanism on said hoisting means for simultaneously turning the hooks into and out of engagement with said gripping members.

8. Apparatus for installing joint support assemblies in a highway while the concrete of the same is in plastic condition, said apparatus including,
a pivot member extending throughout the width of the apparatus and movable vertically,
gripping members, mounted at intervals on said pivot member and each including two parts swingable in opposite directions toward and from each other to support between them the assemblies to be positioned in the concrete,
hoisting means arranged above said pivot shaft and having parts to engage said gripping members,
parts on said hoisting means for engaging said gripping members to swing them upwardly,
a support on which said gripping members are positioned by said hoisting means in position in which one part of each gripping member is in substantial horizontal position and in which the other parts of said gripping members are positioned clear of said first mentioned parts to permit joint support assemblies to be positioned on said substantially horizontal parts to be gripped between said parts when said other part is moved into operative position on the first part.

9. Apparatus for installing joint support assemblies in a highway while the concrete of the same is in plastic condition, said apparatus including,
a pivot member extending throughout the width of the apparatus and movable vertically,
gripping members, mounted at intervals on said pivot member and each including two parts swingable in opposite directions toward and from each other to support between them the assemblies to be positioned in the concrete,
hoisting means arranged above said pivot shaft and having parts to engage said gripping members,
parts on said hoisting means for engaging said gripping members to move them upwardly with one of the parts of each gripping member arranged in horizontal position and the other part of each gripping member swung into angular relation to the first part to enable assemblies to be positioned between said parts of said gripping members.

10. Apparatus according to claim 9 and including supports mounted on said apparatus and movable into position to receive said gripping members when hoisted into position to receive assemblies.

11. Apparatus according to claim 9 and including hooks mounted on said hoisting means, and means on said parts on said gripping members to be engaged by said hooks for moving said gripping member parts into different positions.

12. Apparatus according to claim 11 and including holes in both parts of said gripping members in position to be engaged by said hooks.

13. Apparatus for installing joint support assemblies in a highway while the concrete of the same is in plastic condition, said apparatus including,
- a pivot member extending throughout the width of the apparatus and slidable vertically,
- gripping members mounted at intervals on said pivot member and each including two parts swingable in opposite directions toward each other to support between them the assemblies to be positioned in the concrete, and stop rods extending substantially throughout the width of the apparatus and one stop rod extending through one of the parts of each of said gripping members and the other stop rod extending throughout the other part of each gripping member whereby all parts of the gripping members will swing simultanously above said pivot member.

14. Apparatus according to claim 13 and including vertical guides having vertically movable supporting members for said pivot member, and means for holding said vertically movable members in fixed relation to said apparatus.

15. Apparatus for installing joint support assemblies in a highway while the concrete is in plastic condition between two forms, said apparatus including,
- a pivot member extending throughout the width of the apparatus,
- gripping members mounted at intervals on said pivot member and each including two parts swingable in opposite directions toward and from each other to support between them the assemblies to be positioned in the concrete,
- and stop rods extending across said apparatus and beyond the highway to rest on said forms when the gripping members have moved said assemblies to the desired depth in the concrete,
- one of said stop rods engaging the one part of each gripping member and the other stop rod engaging the other part of each gripping member, whereby movement about said pivot member of one part of a gripping member will be transmitted to all such parts of the gripping members,
- and means for separating said parts of said gripping members and positioning one of the parts of each gripping member into substantially horizontal position to receive an assembly.

16. Highway joint forming assembly including a center plate and a plurality of joint supports mounted thereon, each joint support being formed of two halves frictionally held together,
- said center plate having a hole therein which is larger at one part thereof than at the other part,
- one of said halves of said joint support being formed to pass freely through the larger part of said hole and the other half of said joint support having projections which engage the edges of said larger part of said hole to prevent passage of the second half of said joint support through the same,
- said joint support when said one-half of the joint support is inserted into the larger part of said hole and slid into the smaller part of said hole being confined to said hole by projections on each half of said joint support which engage said center plate about the smaller part of said hole.

17. Highway joint forming assembly including a center plate and a plurality of joint supports mounted thereon.
- said center plate having holes therein each comprising a larger part connected with a smaller part,
- said joint supports each comprising two halves frictionally secured together, said larger hole permitting the passage through the same only of one-half of each joint support and said other half of each joint support having projections which prevent it from passing through either part of said hole,
- said first mentioned half of said joint support having a projection which engages said center plate against movement through said smaller part of said hole when said joint support is moved into the same.

18. Highway joint forming assembly including a center plate and a plurality of joint supports mounted thereon,
- said joint support being formed of two halves frictionally held together,
- said center plate having a hole therein which is larger at one part thereof than at the other part,
- the larger part of said hole permitting passage therethrough of one-half of a joint support and the smaller part of the hole preventing passage of both of said halves of the joint support through the same after the joint support has been slid from the larger part of the hole to the smaller part thereof.

19. Apparatus for positioning in a pavement while in plastic condition a center plate and a plurality of joint supports mounted thereon, each of said joint supports comprising:
- two halves to be positioned on opposite sides of the center plate and frictionally connected with each other,
- said center plate having a hole therein comprising two connected parts, one of which is larger than the other, the larger part of said hole permitting passage therethrough of one-half of a joint support and the smaller part of the hole preventing passage of both of said halves of the joint support through the same after the joint support has been slid from the larger part of the hole to the smaller part thereof,
- and gripping members on said apparatus which engage said center plate and said joint supports to press the same into the pavement, said members engaging said joint supports to hold the same against movement out of the smaller part of each hole.

20. Apparatus according to claim 19 and including projections on said joint supports engageable by said gripping members for holding said joint supports in correct relation to said center plate.

21. Apparatus according to claim 19 in which said gripping members include two parts pivoted to swing toward opposite sides of said center plate,
- said joint supports having projections extending outwardly therefrom in positions to be engaged by said parts of said gripping members if out of their intended positions, to indicate to an operator that adjustment of said joint supports relatively to said apparatus is necessary.

22. Apparatus for positioning joint supports and a center plate in a pavement while the same is in plastic condition,
- said apparatus comprising a plurality of pairs of gripping members, each pair having the lower portions thereof formed to engage a joint support to force the same downwardly into the pavement and having diverging upper portions,
- a pivot member arranged between said diverging upper portions of said gripping members and pivotally connected thereto, said pivot member when raised causing said lower portions of said gripping members to be urged into engagement with the center plate and joint supports.

23. Apparatus according to claim 22 and including rails extending substantially parallel to said pivot member, said upper ends of said diverging portions of said gripping members extending outwardly from said pivot member and being secured to said rails, said apparatus when raised by said rails causing the upper diverging parts of the gripping members and said rails to swing toward each other and the lower parts thereof to swing outwardly into joint support releasing positions.

24. Apparatus for positioning in a pavement while in plastic condition a plurality of joint supports secured to a center plate and having two parts arranged at opposite sides of said center plate with a telescopic connection with each other, said apparatus comprising a pair of gripping members movable toward each other from opposite sides of said center plate for engaging said joint supports to force the same downwardly into the pavement, each gripping member engaging the two parts of said joint supports and holding them in interlocking engagement with each other and with said center plate while forcing the same into the pavement.

25. Apparatus for installing joint support assemblies in a highway while the concrete of the same is in plastic condition and between forms, said apparatus including, a pivot member extending throughout the width of the apparatus, stop members also extending throughout the width of the apparatus to rest on said forms when the said assemblies have been lowered into the concrete, vertically movable parts at opposite sides of said apparatus in which the ends of said pivot members are held for raising and lowering said pivot member, gripping members mounted on said pivot member and each including two parts movable relatively to each other and between which joint support assemblies may be held, one of the parts of each gripping member being connected with one of said stop members and the other part of each gripping member being connected with the other stop member, and releasable means for connecting said stop members with said movable parts for holding the same and said gripping members in fixed relation to said pivot member and to each other.

26. Apparatus for installing joint support assemblies in a highway while the concrete of the same is in plastic condition, said apparatus including, a frame having a base formed of structural members extending crosswise of the apparatus, each of said structural members being divided intermediate of their lengths into two parts releasably connected with each other, a pivot member extending throughout the width of the apparatus, gripping members mounted at intervals on said pivot members to support the assemblies to be positioned in the concrete, stop members also extending throughout the width of the apparatus, said pivot members and stop members also being divided intermediate of their lengths into two parts and, connecting members connecting said two parts of each of said pivot members and stop members and each including a pair of arms both of which are pivotly connected to said pivot member and one of which is connected to one of said stop members to permit said stop members to swing relatively to each other about said pivot member.

27. Apparatus according to claim 26 in which said releasable connections of said frame members are of varying lengths to vary the widths of said base, said connecting members for said pivot member and said stop members are of tubular form in which said pivot and stop members may telescope to vary the length of the same.

References Cited

UNITED STATES PATENTS

| | | | |
|---|---|---|---|
| 2,014,894 | 9/1935 | Heltzel | 94—51 |
| 2,729,152 | 1/1956 | Carnes | 94—51 |
| 3,045,566 | 7/1962 | Houck | 94—51 X |
| 3,098,413 | 7/1963 | Guntert | 94—51 X |
| 3,286,607 | 11/1966 | Middlestadt | 94—51 |
| 3,335,647 | 8/1967 | Thorp | 94—51 |

NILE C. BYERS, JR., *Primary Examiner.*

U.S. Cl. X.R.

94—18